(12) United States Patent
Jamart

(10) Patent No.: US 11,192,821 B2
(45) Date of Patent: Dec. 7, 2021

(54) GLASS SHEET COATED WITH A STACK OF THIN LAYERS AND WITH AN ENAMEL LAYER

(71) Applicant: SAINT-GOBAIN GLASS FRANCE, Courbevoie (FR)

(72) Inventor: Juliette Jamart, Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 22 days.

(21) Appl. No.: 16/767,453

(22) PCT Filed: Nov. 23, 2018

(86) PCT No.: PCT/FR2018/052965
§ 371 (c)(1),
(2) Date: May 27, 2020

(87) PCT Pub. No.: WO2019/106264
PCT Pub. Date: Jun. 6, 2019

(65) Prior Publication Data
US 2020/0392037 A1 Dec. 17, 2020

(30) Foreign Application Priority Data
Nov. 30, 2017 (FR) ..................... 1761391

(51) Int. Cl.
*B32B 15/04* (2006.01)
*C03C 17/34* (2006.01)
*C03C 3/066* (2006.01)
*C03C 4/02* (2006.01)
*C03C 8/04* (2006.01)

(52) U.S. Cl.
CPC .......... *C03C 17/3435* (2013.01); *C03C 3/066* (2013.01); *C03C 4/02* (2013.01); *C03C 8/04* (2013.01); *C03C 2204/04* (2013.01); *C03C 2207/00* (2013.01); *C03C 2217/213* (2013.01); *C03C 2217/231* (2013.01); *C03C 2217/24* (2013.01); *C03C 2217/281* (2013.01); *C03C 2217/948* (2013.01); *C03C 2218/156* (2013.01)

(58) Field of Classification Search
CPC .......... C03C 2217/24; C03C 2217/948; C03C 2204/04
USPC ......................... 428/428, 432, 434
See application file for complete search history.

(56) References Cited

U.S. PATENT DOCUMENTS

| | | | |
|---|---|---|---|
| 2008/0226882 A1* | 9/2008 | Belliot | C03C 17/3435 428/209 |
| 2012/0164443 A1* | 6/2012 | Durandeau | C03C 17/3649 428/336 |
| 2015/0239774 A1* | 8/2015 | Lamine | C23C 14/5813 428/213 |
| 2016/0214887 A1* | 7/2016 | Illy | C03C 17/2456 |

FOREIGN PATENT DOCUMENTS

| | | |
|---|---|---|
| EP | 1 837 311 A1 | 9/2007 |
| FR | 2 987 618 A1 | 9/2013 |
| WO | WO 2014/133929 A2 | 9/2014 |
| WO | WO 2015/033067 A1 | 3/2015 |
| WO | WO 2015/055944 A1 | 4/2015 |

OTHER PUBLICATIONS

International Search Report as issued in International Patent Application No. PCT/FR2018/052965, dated Feb. 20, 2019.

* cited by examiner

*Primary Examiner* — Lauren R Colgan
(74) *Attorney, Agent, or Firm* — Pilsbury Winthrop Shaw Pittman LLP

(57) ABSTRACT

The subject of the invention is a material comprising a glass sheet coated on at least one portion of one of the faces thereof with a stack of thin layers comprising at least one layer based on a nitride, said stack being coated on at least one portion of its surface with an enamel layer comprising bismuth, said stack further comprising, in contact with the enamel layer, a layer, referred to as a contact layer, which is based on an oxide.

21 Claims, No Drawings

GLASS SHEET COATED WITH A STACK OF THIN LAYERS AND WITH AN ENAMEL LAYER

CROSS-REFERENCE TO RELATED APPLICATIONS

This application is the U.S. National Stage of PCT/FR2018/052965, filed Nov. 23, 2018, which in turn claims priority to French patent application number 1761391 filed Nov. 30, 2017. The content of these applications are incorporated herein by reference in their entireties.

The invention relates to the field of materials comprising a glass sheet coated with a stack of thin layers. Such materials are intended to form or be incorporated into building or motor vehicle glazings.

The stacks of thin layers impart various properties to the glazings, for example optical properties (reflective layers or on the contrary antireflection layers), energy properties (solar-control layers and/or low-emissivity layers) or else electrical conduction properties (used for example for heated glazings).

The glass sheets are sometimes coated, on at least one portion of their surface, with an enamel layer. An enamel is a mineral material formed from a composition comprising at least one pigment and at least one glass frit. A glass frit is composed of fine particles of a glass with a low melting point, which under the effect of a firing heat treatment softens and adheres to the glass sheet. Thus a mineral layer that is generally opaque, has a high chemical resistance and mechanical strength is formed, which adheres perfectly to the glass while retaining the pigment particles. The enamel layers may have a decorative or esthetic function, but also a protective function. The enamel layers may for example be deposited at the periphery of glazings in order to hide, and protect from ultraviolet radiation, the polymer seals used to fasten the glazing to the load-bearing structure of the building or to the bodywork opening.

Certain known glazings comprise glass sheets coated, on the same face, with a stack of thin layers then with an enamel layer. There are for example in the construction field glazings referred to as "spandrel glass" used for building facades, and in which the glass sheet is entirely covered with a colored and decorative enamel layer. Solar-control layers are sometimes positioned under the enamel layer in order to limit the heating of the building under the effect of solar radiation. The enamels used in these applications do not however contain bismuth, and few problems of compatibility between the stack of thin layers and the enamel layer have been encountered.

On the other hand, when a glazing coated with a stack of thin layers must be provided with an enamel layer containing bismuth, it is customary to first remove the stack of thin layers at the locations where the enamel layer must be deposited, for example by means of abrasives, so that the enamel is deposited in direct contact with the glass sheet and to avoid any problems of adhesion between the enamel layer and the stack of thin layers. However, mechanical abrasion generates visible scratches, including in the enamel layer. Moreover, it has turned out that enamel layers comprising bismuth deposited directly on the stacks of thin layers would often have degraded optical and chemical resistance properties. Alternatively, application WO 2014/133929 proposes the idea of using special glass frits capable, during the firing, of dissolving the stack of thin layers in order to fasten to the glass. However, such processes are expensive.

The objective of the invention is to provide glass sheets coated with a stack of thin layers and with an enamel layer which are less expensive to produce, and such that the enamel has good optical, adhesion and chemical resistance properties.

For this purpose, one subject of the invention is a material comprising a glass sheet coated on at least one portion of one of the faces thereof (hereinafter first face) with a stack of thin layers comprising at least one layer based on a nitride, said stack being coated on at least one portion of its surface with an enamel layer comprising bismuth, said stack further comprising, in contact with the enamel layer, a layer, referred to as a contact layer, which is based on an oxide.

Another subject of the invention is a process for manufacturing a material according to the invention, comprising the deposition of a stack of thin layers comprising at least one layer based on a nitride on at least one portion of a face of a glass sheet, then the deposition, on at least one portion of the surface of said stack, of an enamel layer comprising bismuth.

Contrary to what is proposed in the aforementioned application WO 2014/133929, the stack of thin layers is not degraded by the deposition of the enamel. The material according to the invention therefore has, in a superposed manner, a stack of thin layers then an enamel layer, the latter not being in contact with the glass sheet. The presence of a contact layer enables the enamel layers comprising bismuth and the stacks of thin layers comprising at least one nitride layer to be made compatible, in the sense that no major optical or mechanical defect is observed after firing of the enamel. The inventors have been able to demonstrate that the defects observed when an enamel layer comprising bismuth was fired in contact with a stack of layers comprising at least one nitride layer were due to the appearance of bubbles within the enamel, close to the interface between the stack and the enamel. These bubbles give rise to a significant drop in adhesion of the enamel, modifying its optical appearance (in particular the color on the glass side, i.e. on the side opposite to the enamel) and reduce its chemical resistance, in particular its resistance to acids. The use of a contact layer makes it possible to eliminate the appearance of bubbles, or at the very least to shift the temperature at which these bubbles appear to above the temperatures used for the firing of the enamel, in particular above temperatures for bending the glass.

The glass sheet is preferably flat, in particular when the material is intended for building glazings, or curved, especially when the material is intended for motor vehicle glazings. The glass sheet is generally flat when the stack of thin layers then the enamel layer are deposited, and may then be bent. The glass is typically a soda-lime-silica glass, but other glasses, for example borosilicates or aluminosilicates may also be used. The glass sheet is preferably obtained by the float process, i.e. by a process consisting in pouring molten glass onto a bath of molten tin. The glass sheet may be mechanically reinforced, in particular thermally tempered or hardened.

In order to do this, the glass sheet is heated at a temperature of around 600° C. or higher, which treatment may result, if desired, in a bending of the glass, then cooled rapidly in order to create compressive stresses at its surface. The firing of the enamel preferably takes place during this heat treatment. The glass sheet may be clear or tinted, for example green, blue, grey or bronze. The glass sheet preferably has a thickness within a range from 0.7 to 19 mm, in particular from 1 to 10 mm, particularly from 2 to 6 mm, or even from 2 to 4 mm.

The glass sheet is preferably coated with the stack of thin layers over at least 70%, in particular 80%, or even over the whole of the surface of the first face. The stack is preferably coated by the enamel layer over at most 40%, in particular 30% and even 20%, or even 15% of its surface.

The term "contact" is understood in the present text to mean a physical contact. The expression "based on" is preferably understood to mean the fact that the layer in question comprises at least 50% by weight of the material considered, in particular 60%, or even 70% and even 80% or 90%. The layer may even essentially consist of or consist of this material. The expression "essentially consist of" should be understood to mean that the layer may comprise impurities that have no influence on its properties. The terms "oxide" or "nitride" do not necessarily mean that the oxides or nitrides are stoichiometric. Indeed they may be substoichiometric, superstoichiometric or stoichiometric.

The stack comprises at least one layer based on a nitride and also a contact layer based on an oxide.

The at least one layer based on a nitride preferably comprises a nitride of at least one element selected from aluminum, silicon, zirconium, titanium. It may comprise a nitride of at least two or three of these elements, for example a silicon zirconium nitride, or a silicon aluminum nitride. Preferably, the layer based on a nitride is a layer based on silicon nitride, more particularly a layer essentially consisting of a silicon nitride. When the silicon nitride layer is deposited by sputtering it generally contains aluminum, since it is customary to dope the silicon targets with aluminum in order to accelerate the deposition rates.

The at least one layer based on a nitride preferably has a physical thickness within a range from 2 to 100 nm, in particular from 5 to 80 nm.

Nitride-based layers are commonly used in many stacks of thin layers since they have advantageous blocking properties, in the sense that they prevent the oxidation of other layers present in the stack, in particular functional layers that will be described below. The inventors have however been able to demonstrate that the presence of these layers did not make it possible to obtain the required properties in terms of adhesion, chemical resistance and esthetics with bismuth-containing enamels, unless a contact layer is positioned on top of the nitride-based layers, in direct contact with the enamel layer.

Preferably, the contact layer comprises an oxide of at least one element selected from aluminum, silicon, titanium, zinc, zirconium, tin. The contact layer may comprise an oxide of at least two or three of these elements, for example a zinc tin oxide, or a silicon aluminum oxide.

The contact layer is advantageously a layer based on silicon oxide, more particularly a layer essentially consisting of a silicon oxide. When the silicon oxide layer is deposited by sputtering, it generally contains aluminum, since it is customary to dope the silicon targets with aluminum in order to accelerate the deposition rates.

The contact layer preferably has a physical thickness of at least 40 nm, or even 50 nm and even 80 or 100 nm, or else 150 or 200 nm. This thickness is preferably at most 2 μm, in particular 1 μm, or even 500 nm and even 100 nm. The inventors have been able to demonstrate that increasing the thickness of the contact layer made it possible to shift the appearance of bubbles at the interface between the coating and the enamel to higher temperatures. Increasing the thickness of the contact layer is therefore favorable for obtaining good properties in terms of adhesion, chemical resistance and esthetics of the bismuth-containing enamel. As described in detail below in the present description, a thinner thickness may however be compensated for by the choice of particular enamel compositions, referred to as "preferred compositions".

Preferably, at least one layer based on a nitride is in contact with the contact layer.

The stack preferably comprises at least one functional layer, in particular an electrically conductive functional layer. The functional layer is preferably between two dielectric thin layers, at least one of which is a nitride-based layer. Other possible dielectric layers are for example oxide or oxynitride layers.

At least one electrically conductive functional layer is advantageously selected from metal layers, in particular silver or niobium layers, and the layers of a transparent conductive oxide, in particular chosen from indium tin oxide, doped tin oxides (for example doped with fluorine or antimony), doped zinc oxides (for example doped with aluminum or gallium). These layers are particularly valued for their low emissivity, which gives the glazings excellent thermal insulation properties. In the glazings fitted in land-based vehicles, in particular motor vehicles and railroad vehicles, or else airborne or maritime vehicles, low-emissivity glazings make it possible, when the weather is hot, to reflect a portion of the solar radiation outward, and therefore to limit the heating of the passenger compartment of said vehicles and, where appropriate to reduce the air conditioning costs. In contrast, when the weather is cold, these glazings make it possible to retain heat in the passenger compartment, and consequently to reduce the heating load. The same applies in the case of glazings fitted in buildings.

The stack of thin layers preferably comprises at least one indium tin oxide layer. Its physical thickness is preferably between 30 and 200 nm, in particular between 40 and 150 nm. This layer is advantageously between two layers based on nitride, in particular on silicon nitride. The contact layer is preferably based on silicon oxide.

At least one portion of the stack of thin layers may be deposited by various known techniques, for example by chemical vapor deposition (CVD), or by sputtering, in particular enhanced by a magnetic field (magnetron process).

According to one embodiment, the whole of the stack of thin layers is deposited by sputtering, in particular magnetron sputtering. In this process, a plasma is created under high vacuum in the vicinity of a target comprising the chemical elements to be deposited. The active entities of the plasma, on bombarding the target, tear off said elements, which are deposited on the glass sheet, forming the desired thin layer. This process is termed "reactive" when the layer consists of a material resulting from a chemical reaction between the elements torn from the target and the gas contained in the plasma. The major advantage of this process lies in the possibility of depositing, on the same line, a very complex stack of layers by successively making the glass sheet run under various targets, generally in one and the same device.

According to another embodiment, the whole of the stack of thin layers, with the exception of the contact layer, is deposited by sputtering, in particular magnetron sputtering. In this case, the contact layer is preferably deposited by a sol-gel process. In the latter process, a sol containing precursors of the layer to be produced is deposited on the glass sheet by various means, such as spraying, curtain coating, flow coating, roll coating, screenprinting, etc. Deposition by screenprinting advantageously makes it possible to only apply the sol in the zones intended to be coated by the enamel layer. The sol preferably contains organometallic precursors of the layer to be produced, for example tetraethyl orthosilicate (TEOS). The layer is then dried and then annealed in order to densify it. This process makes it possible to obtain thicker contact layers than by the sputtering process. The physical thickness of the contact layer may thus be at least 100, in particular 200 and even 500 nm, or even 1 μm and more.

The enamel layer is preferably formed from a composition comprising at least one pigment and at least one bismuth borosilicate glass frit, preferably a bismuth zinc borosilicate glass frit, as explained in the remainder of the text. The enamel layer preferably does not comprise lead oxide.

The enamel composition generally further comprises an organic medium, intended to facilitate the application of the composition on the substrate and also the temporary adhesion thereof to the latter, and which is eliminated during the firing of the enamel. The medium typically comprises solvents, diluents, oils and/or resins. In the present text, an "enamel composition" is described as the liquid composition which is used to deposit, on the glass sheet, a wet enamel layer. The term "enamel layer" is used to describe the final layer, after firing, whereas the term "wet enamel layer" is used to describe the enamel layer before firing.

The enamel layer is preferably deposited by screenprinting. In order to do this, a screen-printing screen, which comprises meshes, some of which are blocked off, is positioned on the glass sheet then the enamel composition is deposited on the screen, and then a blade is applied in order to force the enamel composition through the screen in the zones where the meshes of the screen are not blocked off so as to form a wet enamel layer.

The deposition of the enamel layer comprises a step of firing, preferably at a temperature of at least 600 and even 650° C., and of at most 700° C., preferably during a bending and/or tempering treatment of the glass sheet.

The pigments preferably comprise one or more oxides selected from oxides of chromium, copper, iron, manganese, cobalt, nickel. By way of example, they may be copper and/or iron chromates.

In one preferred embodiment of the invention, the enamel layer is based on bismuth zinc borosilicate.

More particularly, the enamel layer advantageously has a chemical composition ("preferred composition") comprising the following oxides, in contents by weight that vary within the limits mentioned below:

$B_2O_3$ 1-10%, in particular 2-8%
$SiO_2$ 15-40%, in particular 20-35%
$Bi_2O_3$ 5-45%, in particular 10-40%
$ZnO$ 7-25%, in particular 8-20%.

The composition advantageously comprises at least one alkali metal oxide, in particular potassium oxide, in contents of at most 5%. The composition preferably contains titanium oxide ($TiO_2$), in contents ranging from 1 to 10%, in particular from 2 to 7%. The composition also comprises pigments, for example copper chromates. In this case, the typical contents of $Cr_2O_3$ and $CuO$ will respectively range from 8 to 20% and from 3 to 12%. The $ZnO/Bi_2O_3$ weight ratio is advantageously at least 0.2, in particular between 0.2 and 1.

The chemical composition of the enamel may be determined by conventional chemical analysis methods, in particular from the fired enamel. It is therefore definitely the chemical composition of the fired enamel layer, and not of the glass frit used to form the enamel.

These preferred compositions prove in particular compatible with the stacks of thin layers comprising at least one nitride layer. Although the contact layer is still necessary, it has turned out that the use of these preferred compositions made it possible to shift the appearance of bubbles to high temperatures, or even to completely eliminate this appearance, and therefore to obtain excellent results in terms of adhesion, chemical resistance and optical properties, even for very thin contact layer thicknesses. Without knowing the exact reason therefor, these advantageous effects are in particular due to the presence of a minimal amount of zinc oxide in the composition.

Preferably the enamel layer is opaque, of black hue. It advantageously forms a strip at the periphery of the glass sheet. In this way, the enamel layer is capable of hiding, and protecting against ultraviolet radiation, seals, connecting elements, or else sensors.

Another subject of the invention is a glazing comprising at least one material as described above. Such a glazing may be both a building glazing and a glazing for a land-based, railroad, maritime or airborne transport vehicle.

This glazing is in particular a glazing for a motor vehicle roof, wherein the face of the glass sheet supporting the stack of thin layers and the enamel layer is the inner face of the glazing. The glass sheet is preferably mechanically reinforced (in particular by thermal tempering) and/or laminated with at least one other glass sheet by means of a lamination interlayer. The lamination interlayer is for example a sheet of polyvinyl butyral (PVB).

In a first embodiment, the glazing, in particular for a motor vehicle roof, is composed of a tinted glass sheet, generally thermally tempered, coated on the inner face of the glazing (the one intended to be turned toward and in contact with the inside of the passenger compartment of the vehicle) with a stack containing an indium tin oxide layer between two silicon nitride layers, the contact layer being a silicon oxide layer, then with an enamel layer deposited at the periphery of the glass sheet.

According to a variant of this first embodiment, the glass sheet may also be laminated by means of a PVB interlayer with another glass sheet, located closer to the outside of the passenger compartment. In this case, at least one glass sheet and/or the PVB interlayer is preferably tinted. In this variant, the glass sheets are preferably not thermally tempered.

According to a second embodiment, the glazing, in particular for a motor vehicle roof, is composed of a first glass sheet laminated by means of an interlayer (for example made of PVB) with a second glass sheet, located closer to the inside of the passenger compartment. The first glass sheet is coated, on its face in contact with the interlayer (referred to as face 2), with a stack of thin layers comprising at least one silver layer, then with an enamel layer deposited at the periphery of the glass sheet. The second glass sheet may be coated on its inner face (the one intended to be turned toward and in contact with the inside of the passenger compartment of the vehicle, referred to as face 4) with a stack containing an indium tin oxide layer. At least one glass sheet and/or the PVB interlayer is preferably tinted. The glass sheets are preferably not thermally tempered.

The following exemplary embodiments illustrate the invention in a nonlimiting manner.

First Series of Examples: Stacks Comprising, as Functional Layer, a Transparent Conductive Oxide Layer Glass sheets coated with stacks of thin layers were then enamelled by screenprinting then firing of the enamel.

The stack studied here, denoted by E1, is a low-emissivity stack deposited by magnetron sputtering and successively comprising, starting from the glass sheet, a layer of silicon nitride (30 nm), a layer of silicon oxide (15-20 nm), a layer of indium tin oxide (ITO, 70-80 nm), a layer of silicon nitride (5-10 nm) and finally a contact layer of silicon oxide (variable thickness denoted by X hereinafter).

The comparative stack (E2) differs from the stack E1 in that it does not comprise a contact layer within the meaning of the invention, and therefore finishes with a layer of silicon nitride.

Various enamel compositions were tested, the chemical composition of which by weight is indicated in table 1 below.

TABLE 1

|  | A | B | C | D | E | F |
|---|---|---|---|---|---|---|
| $B_2O_3$ | 7.4 | 6.1 | 3.4 | 3.7 | 4.5 | 4.3 |
| $SiO_2$ | 32.7 | 24.7 | 27.6 | 28.1 | 29.1 | 28.0 |
| $Bi_2O_3$ | — | 32.1 | 28.3 | 33.0 | 24.4 | 14.1 |
| ZnO | 15.9 | 5.0 | 13.3 | 10.8 | 12.4 | 16.3 |
| $Na_2O$ | 9.9 | — | — | — | — | — |
| $TiO_2$ | 5.4 | 3.2 | 3.4 | 3.4 | 4.0 | 4.9 |
| $Al_2O_3$ | 2.2 | 0.8 | 0.7 | 0.7 | 0.8 | 0.6 |
| $K_2O$ | 2.4 | 2.6 | 2.6 | 2.2 | 2.7 | 2.7 |
| $Cr_2O_3$ | 16.0 | 16.5 | 12.9 | 11.0 | 12.8 | 17.9 |
| $MnO_2$ | — | — | — | — | 3.6 | — |
| CuO | 8.0 | 9.0 | 6.8 | 6.2 | 5.1 | 9.0 |
| Others | 0.1 | — | 1.0 | 0.8 | 0.6 | 2.2 |

Enamel A (comparative) is an enamel based on zinc and not on bismuth. Enamels B to F are enamels comprising bismuth, more particularly based on bismuth zinc borosilicate, and may therefore be used within the context of the invention. Enamels C to F further have the preferred composition described above, rich in zinc oxide. The layer of enamel was deposited by screenprinting, with a wet layer thickness of 25 μm.

Table 2 below recapitulates results obtained by indicating for each example the nature of the stack, where appropriate the physical thickness of the contact layer, denoted by X and expressed in nanometers, the enamel used, and finally the temperature at which bubbles appear at the interface between the enamel layer and the stack, denoted by Tx and expressed in ° C.

The temperature Tx is determined by firing the enamel at various temperatures for 200 seconds and by detecting the appearance of bubbles by visual observation and measuring the reflectance of the enamel after firing. The appearance of bubbles specifically leads to a drop in the reflectance of the enamel layer. The time of 200 seconds is representative of a bending-tempering treatment between rollers, used for example for the production of tempered monolithic glazing. In this case a representative bending temperature is 650° C.

TABLE 2

|  | Stack | X (nm) | Enamel | Tx (° C.) |
|---|---|---|---|---|
| C1 | E2 | — | A | >710 |
| C2 | E2 | — | B | <600 |
| 1 | E1 | 50 | B | 668 |
| 2 | E1 | 33 | B | 653 |
| 3 | E1 | 45 | B | 662 |
| 4 | E1 | 50 | C | >710 |
| 5 | E1 | 50 | D | >710 |
| 6 | E1 | 50 | E | >710 |
| 7 | E1 | 50 | F | >710 |

A temperature Tx denoted by >710° C. means that no bubbling is observed at 710° C. It is therefore possible either that no bubbling occurs, or that bubbles appear, but in any case at a higher temperature.

Comparative example C1, which uses a zinc enamel, shows that these enamels do not pose problems of compatibility with stacks comprising nitrites, even in the absence of a contact layer. These enamels are not however suitable for motor vehicle glass bending operations, since they are capable, at high temperature, of adhering to the bending tools.

Comparative example C2 shows a contrario that bismuth enamels do pose problems of compatibility with the stacks comprising nitride layers, since bubbling appears from before 600° C. Yet bending or tempering treatments generally involve temperatures higher than this value.

Examples 1 to 3 according to the invention show that the addition of a contact layer makes it possible to shift the appearance of bubbles to higher temperatures, especially when this layer is thick. It is therefore possible to obtain good results with this combination of stack and enamel when the bending does not involve excessively high temperatures. A few defects may appear at the edge of the glazing, where the temperatures are the highest.

For examples 4 to 7 on the other hand, which use the preferred enamel compositions described above, no bubbling is observed at temperatures as high as 710° C. Good results are therefore obtained for all the bending temperatures used in practice.

Second Series of Examples: Stacks Comprising Silver Functional Layers

The stack studied in this series of examples is a low-emissivity stack, denoted by E3, deposited by sputtering, comprising 4 silver layers surrounded by dielectric layers. The last two layers of the stack (furthest from the glass sheet) are a layer of silicon nitride then a contact layer of silicon oxide having a variable thickness (denoted by X hereinafter).

The comparative stack (E4) only differs from the stack E3 in that it does not comprise a contact layer. It therefore finishes with a layer of silicon nitride.

Various enamel compositions were tested, the chemical composition of which by weight is indicated in table 3 below.

TABLE 3

|  | A | H | I |
|---|---|---|---|
| $B_2O_3$ | 7.4 | 4.1 | 2.8 |
| $SiO_2$ | 32.7 | 46.9 | 44.7 |
| $Bi_2O_3$ | — | 11.2 | 3.4 |
| ZnO | 15.9 | 4.6 | 22.7 |
| $Na_2O$ | 9.9 | — | — |
| $TiO_2$ | 5.4 | 2.7 | 5.0 |
| $Al_2O_3$ | 2.2 | 0.7 | 1.1 |
| $K_2O$ | 2.4 | — | 1.3 |
| $Li_2O$ | — | 6.5 | — |
| $Cr_2O_3$ | 16.0 | 8.4 | 8.7 |
| $MnO_2$ | — | 5.3 | — |
| CuO | 8.0 | 9.0 | 9.7 |
| Others | 0.1 | 0.6 | 0.6 |

Table 4 below recapitulates the results obtained by indicating for each example the nature of the stack, where appropriate the physical thickness of the contact layer, denoted by X and expressed in nanometers, the enamel used, and finally the temperature at which bubbles appear at the interface between the enamel layer and the stack, denoted by Tx and expressed in ° C.

The temperature Tx is determined by firing the enamel at various temperatures for 480 seconds and by detecting the appearance of bubbles by visual observation and measuring the reflectance of the enamel after firing. The appearance of bubbles specifically leads to a drop in the reflectance of the enamel layer. The time of 480 seconds is representative of a gravity bending treatment of glass sheets that are intended subsequently to be laminated. In this case a representative bending temperature is 600° C.

Prior to the heat treatment, a pretreatment at 580° C. for 2 minutes was carried out. In an industrial bending process, the two glass sheets intended to be laminated are bent together, and such a pretreatment, carried out on the enameled glass sheet, makes it possible to avoid adhesive bonding between the enamel and the second glass sheet.

TABLE 4

|    | Stack | X (nm) | Enamel | Tx (° C.) |
|----|-------|--------|--------|-----------|
| C3 | E4    | —      | A      | >650° C.  |
| C4 | E4    | —      | H      | <560° C.  |
| C5 | E4    | —      | I      | <560° C.  |
| 8  | E3    | 35     | H      | 595° C.   |
| 9  | E3    | 20     | I      | 590° C.   |
| 10 | E3    | 50     | I      | 615° C.   |

Comparative example C3, which uses a zinc enamel, confirms that these enamels do not pose problems of compatibility with stacks comprising nitrites, even in the absence of a contact layer. These enamels cannot however be used since they give rise to adhesive bonding with the second glass sheet.

Comparative examples C4 and C5 themselves confirm that bismuth enamels do pose problems of compatibility with the stacks comprising nitride layers, since bubbling appears from before 560° C.

The addition of a contact layer (examples 8 to 10) makes it possible to increase the temperature at which bubbles appear, around 600° C. and above.

The invention claimed is:

1. A material comprising a glass sheet coated on at least one portion of one of the faces thereof with a stack of thin layers comprising at least one layer based on a nitride, said stack being coated on at least one portion of its surface with an enamel layer comprising bismuth, said stack further comprising, in contact with the enamel layer, a contact layer, which is based on an oxide.

2. The material as claimed in claim 1, wherein the at least one layer based on a nitride comprises a nitride of at least one element selected from aluminum, silicon, zirconium, and titanium.

3. The material as claimed in claim 2, wherein the at least one layer based on a nitride is a layer based on silicon nitride.

4. The material as claimed in claim 1, wherein the contact layer comprises an oxide of at least one element selected from aluminum, silicon, titanium, zinc, zirconium, and tin.

5. The material as claimed in claim 4, wherein the contact layer is a layer based on silicon oxide.

6. The material as claimed in claim 1, wherein at least one layer based on a nitride is in contact with the contact layer.

7. The material as claimed in claim 1, wherein the contact layer has a physical thickness of at least 40 nm.

8. The material as claimed in claim 1, wherein the stack comprises at least one functional layer.

9. The material as claimed in claim 8, wherein the at least one functional layer is an electrically conductive functional layer.

10. The material as claimed in claim 9, wherein at least one electrically conductive functional layer is selected from metal layers and layers of a transparent conductive oxide.

11. The material as claimed in claim 10, wherein the metal layers are silver or niobium layers, and the layers of a transparent conductive oxide are layers of indium tin oxide, doped tin oxides, doped zinc oxides.

12. The material as claimed in claim 1, wherein the enamel layer is based on bismuth zinc borosilicate.

13. The material as claimed in claim 12, wherein the enamel layer has a chemical composition comprising the following oxides, in contents by weight that vary within the limits mentioned below:

| $B_2O_3$ | 1-10%,  |
|----------|---------|
| $SiO_2$  | 15-40%  |
| $Bi_2O_3$| 5-45%,  |
| ZnO      | 7-25%.  |

14. The material as claimed in claim 13, wherein the enamel layer has a chemical composition comprising the following oxides, in contents by weight that vary within the limits mentioned below:

| $B_2O_3$ | 2-8%,   |
|----------|---------|
| $SiO_2$  | 20-35%  |
| $Bi_2O_3$| 10-40%, |
| ZnO      | 8-20%.  |

15. The material as claimed in claim 1, wherein the enamel layer is opaque, of black hue, and forms a strip at the periphery of the glass sheet.

16. A glazing comprising at least one material as claimed in claim 1.

17. The glazing as claimed in claim 16, wherein the glazing is a glazing for a motor vehicle roof, wherein the face of the glass sheet supporting the stack of thin layers and the enamel layer is the inner face of the glazing, said glass sheet being mechanically reinforced and/or laminated with at least one other glass sheet by means of a lamination interlayer.

18. A process for manufacturing a material as claimed in claim 1, comprising depositing a stack of thin layers comprising at least one layer based on a nitride on at least one portion of a face of a glass sheet, then depositing, on at least one portion of the surface of said stack, an enamel layer comprising bismuth.

19. The process as claimed in claim 18, wherein at least one portion of the stack of thin layers is deposited by chemical vapor deposition or by sputtering.

20. The process as claimed in claim 18, wherein the deposition of the enamel layer comprises a step of firing at a temperature of at least 600° C.

21. The process as claimed in claim 20, wherein the firing is during a bending and/or tempering treatment of the glass sheet.

* * * * *